(12) United States Patent
Pastore

(10) Patent No.: US 9,221,300 B1
(45) Date of Patent: *Dec. 29, 2015

(54) SYSTEM AND METHOD FOR A REMOVABLE WHEEL DEVICE FOR A FIELD GAME GOAL

(71) Applicant: Joseph Pastore, Gilbert, AZ (US)

(72) Inventor: Joseph Pastore, Gilbert, AZ (US)

(*) Notice: Subject to any disclaimer, the term of this patent is extended or adjusted under 35 U.S.C. 154(b) by 133 days.

This patent is subject to a terminal disclaimer.

(21) Appl. No.: 14/026,602

(22) Filed: Sep. 13, 2013

Related U.S. Application Data

(63) Continuation-in-part of application No. 12/950,225, filed on Nov. 19, 2010, now Pat. No. 8,535,184.

(60) Provisional application No. 61/395,287, filed on May 10, 2010.

(51) Int. Cl.
*A63B 63/00* (2006.01)
*B60B 33/00* (2006.01)

(52) U.S. Cl.
CPC ..................... *B60B 33/00* (2013.01)

(58) Field of Classification Search
CPC ..................................................... A63B 63/00
USPC ....... 473/478; 403/353, 293; 36/73; 280/841, 280/79.3, 79.2, 7.13, 13, 11.209, 11.208, 280/11.19; 248/73, 688, 599, 596, 574, 248/224.51, 222.41; 224/547; 16/22, 29, 30
See application file for complete search history.

(56) References Cited

U.S. PATENT DOCUMENTS

| 422,729 | A | 3/1809 | Clark |
|---|---|---|---|
| 1,017,799 | A | 2/1912 | Read |
| 1,061,912 | A | 5/1913 | Hilfrank |
| 1,171,569 | A | 2/1916 | Wanda |
| 1,530,116 | A | 3/1925 | Hawknis |
| 1,532,064 | A | 3/1925 | Neiswender |
| 1,895,882 | A * | 1/1933 | Herold ............................. 16/21 |
| 2,008,087 | A * | 7/1935 | Stromberg .................... 403/189 |
| 2,229,632 | A * | 1/1941 | Bender et al. ............ 280/11.209 |
| 2,361,592 | A | 10/1944 | Bjork |
| 2,450,228 | A * | 9/1948 | Blazey ............................. 16/29 |
| 2,485,923 | A * | 10/1949 | Rumpakis et al. ................ 36/73 |
| 2,790,196 | A | 4/1957 | Rideout et al. |
| 2,800,679 | A * | 7/1957 | Schultz, Jr. ....................... 16/29 |
| 2,834,608 | A | 5/1958 | Wixson |
| 3,685,866 | A * | 8/1972 | Patenaude ..................... 403/189 |
| 3,879,798 | A | 4/1975 | Krulwich |
| 4,008,901 | A * | 2/1977 | Conn ........................... 280/7.13 |
| 4,028,773 | A | 6/1977 | Morgan |
| 4,134,598 | A * | 1/1979 | Urisaka ......................... 280/842 |
| 4,135,725 | A | 1/1979 | DiRoma |
| 4,336,629 | A * | 6/1982 | Jarvis et al. .................... 16/35 R |

(Continued)

*Primary Examiner* — Gene Kim
*Assistant Examiner* — M Chambers
(74) *Attorney, Agent, or Firm* — Lisa Foundation Patent Law Clinic, Arizona State University

(57) ABSTRACT

A removable wheel device which slides onto the base of a sports field goal. The wheel device allows one person to move a goal across a field without using excessive force by sliding one wheel device onto the base of each goalpost and using leverage to tilt the goal and push or pull it for a distance. When inserted onto the base of the goal, the wheel device does not require any type of fastening to remain in place, but rather uses its own unique shape to hold onto the goal. Because field goals vary in structure, so too do each of the embodiments of the removable wheel device. Some of these variances include the angle of the axle, the location and structure of the notch, and the use of a protrusion.

11 Claims, 7 Drawing Sheets

(56) References Cited

U.S. PATENT DOCUMENTS

| | | |
|---|---|---|
| 4,351,540 A | 9/1982 | Minnebraker |
| 4,843,678 A | 7/1989 | Park |
| 5,018,930 A | 5/1991 | Hardin et al. |
| 5,088,799 A | 2/1992 | Redmon et al. |
| 5,273,292 A | 12/1993 | Pardi et al. |
| 5,330,064 A | 7/1994 | Hall |
| 5,428,866 A | 7/1995 | Aschow |
| 5,531,463 A | 7/1996 | Givens |
| 5,599,031 A | 2/1997 | Hodges |
| 5,740,584 A | 4/1998 | Hodge et al. |
| 6,105,782 A * | 8/2000 | Fujimori et al. ............ 206/710 |
| 6,450,515 B1 | 9/2002 | Guth |
| 6,595,334 B1 | 7/2003 | Saetia |
| 6,721,970 B1 | 4/2004 | Cheng |
| 6,942,735 B2 | 9/2005 | Rich |
| 7,328,907 B1 | 2/2008 | Bileth |
| 7,506,404 B2 | 3/2009 | Block et al. |
| 7,647,673 B2 | 1/2010 | Melara |
| 8,535,184 B2 * | 9/2013 | Pastore ...................... 473/478 |
| 2003/0127815 A1 | 7/2003 | Hall |
| 2007/0103040 A1 | 5/2007 | Barrett et al. |
| 2011/0275461 A1 | 11/2011 | Pastore |

* cited by examiner

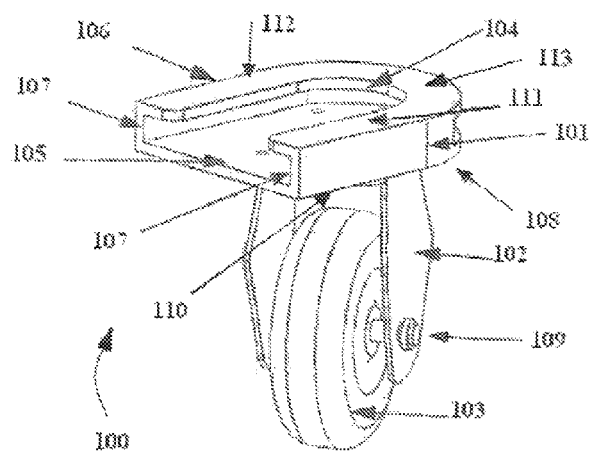
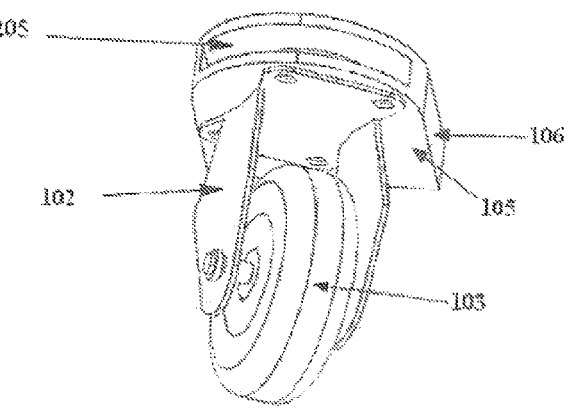
Figure 1
Figure 2
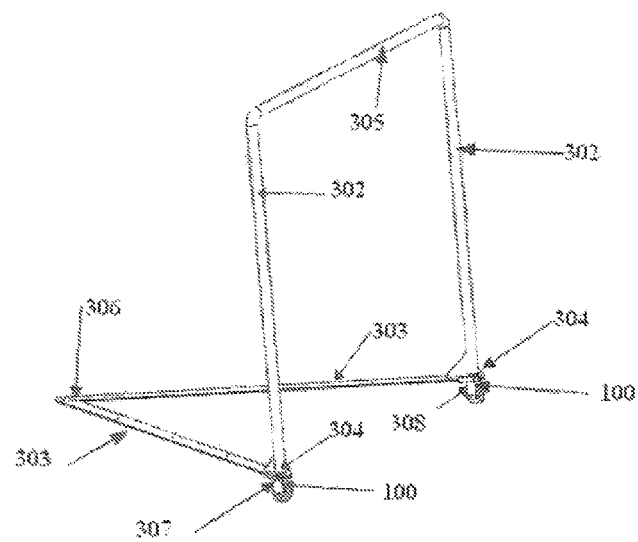
Figure 3

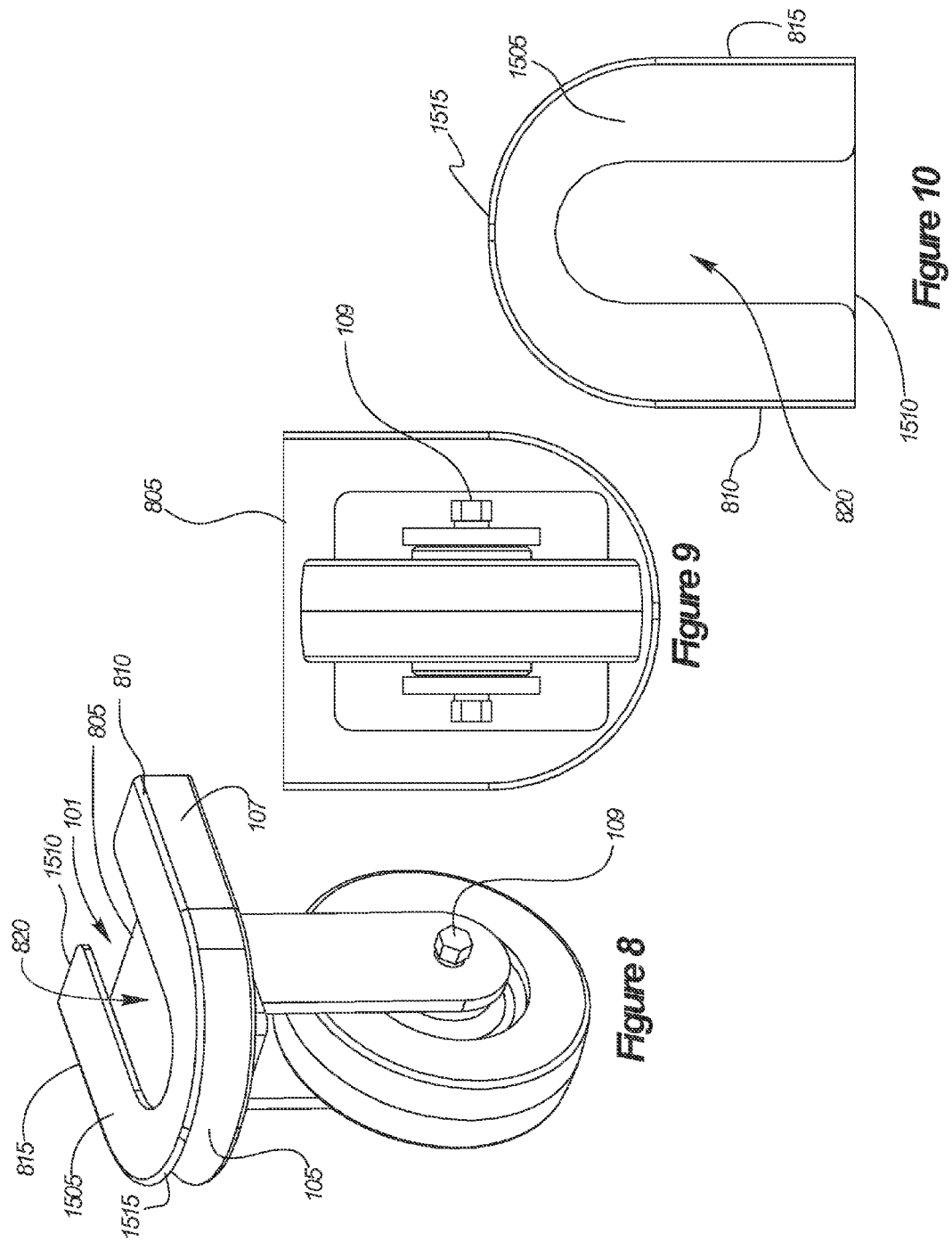

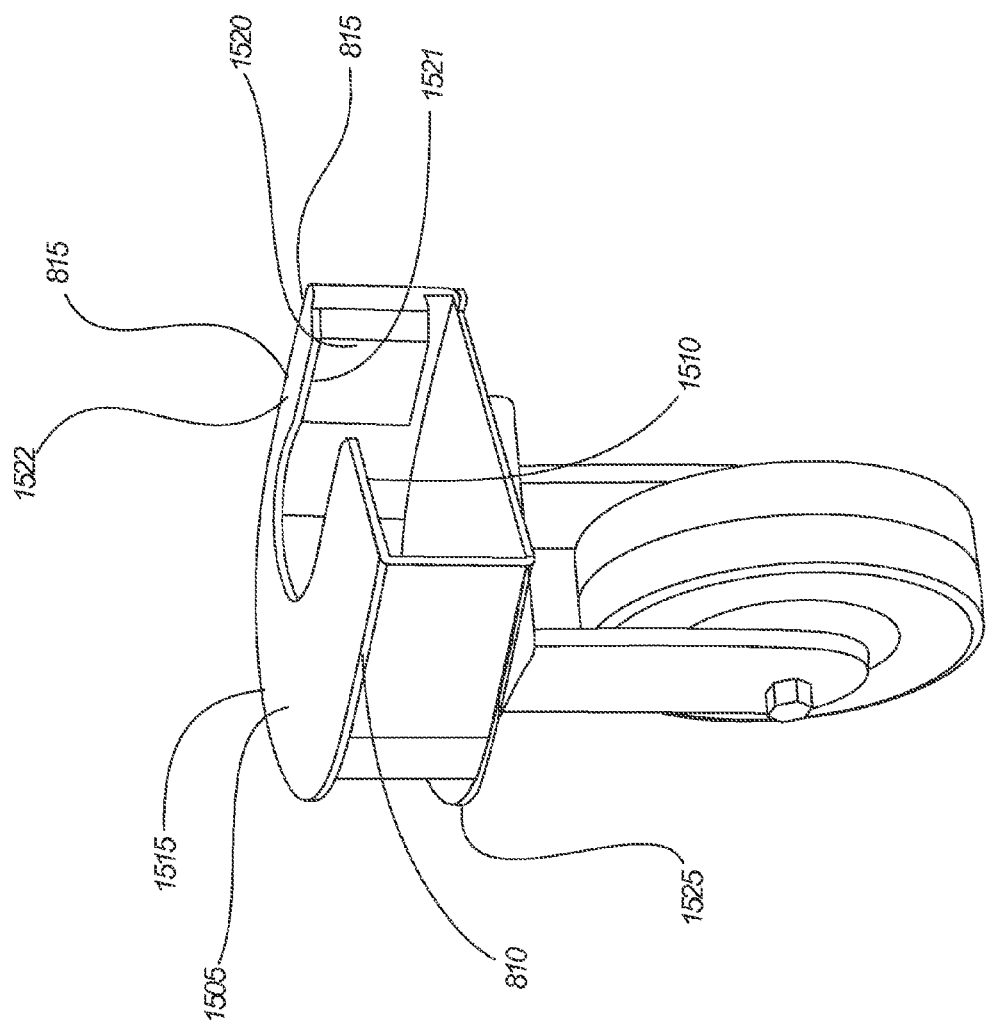

SYSTEM AND METHOD FOR A REMOVABLE WHEEL DEVICE FOR A FIELD GAME GOAL

CROSS REFERENCE TO RELATED APPLICATION

This application is a Continuation in Part of U.S. patent application Ser. No. 12/950,255 filed on Nov. 19, 2010 entitled "System and Method for a Removable Wheel Device" and claims priority to U.S. Provisional Application No. 61/395,287 filed on May 10, 2010 entitled "Lacrosse Goal Carrier 'Goal Caddie", the contents of which are hereby incorporated by reference in their entirety.

BACKGROUND OF THE INVENTION

1. Field of the Invention

This invention is generally in the field of detachable wheeled supporting devices for the goal frame in a field game.

2. Description of Related Art

Goals for a field game, such as soccer, lacrosse, or hockey, are not readily moveable, especially by a single person. Traditionally, wheels or caster assemblies are attached by welding or screwing to the bottom of a heavy object to make the object movable. However, welding or screwing wheels or caster assemblies to a goal frame would damage the body of the goal. Mounting the wheels or caster assemblies to the goal frame may also change the measure of the goal, making the dimension incompliant to the official measure for that game, if the goal is not designed to accommodate the wheels or caster assemblies.

So as to reduce the complexity and length of the Detailed Specification, and to fully establish the state of the art in certain areas of technology, Applicant herein expressly incorporates by reference all of the following materials identified in each numbered paragraph below.

U.S. Pat. No. 5,273,292 (1993) describes a portable soccer goal assembly that comprises a plurality of rollers or wheels mounted on the outrigger to facilitate the movement of the goal frame. The milers or wheels may be retractable when the goal is in use. However, these rollers or wheels are part of the design of the portable soccer goal, rather than detachable devices accommodated to goals made by different manufactures.

U.S. Pat. No. 4,843,678 (1989) describes a caster pad that is attachable to the bottom of a receptacle and adapted to receive and hold a replaceable caster assembly. The caster pad comprises a rectangular base with a flange at each of its four edges and a U-shaped rod. The rectangular base is attached to the bottom of the receptacle with screws, bolts or rivets. With the U-shaped rod entering the holes of one flange and extending out of the holes of the opposite flange, the plate of the replaceable caster assembly is captured between the rectangular base and the arms of the U-shaped rod.

U.S. Pat. No. 5,740,584 (1998) describes a releasable caster holder that is welded to a heavy, unwieldy object with a frame and is mounted to a removable caster. The frame of the caster holder comprises two end walls and two side walls. The caster holder does not have a pad portion in order to reduce its weight.

Applicant believes that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant will amend the specification to expressly recite the essential material that is incorporated by reference as allowed by the applicable rules.

BRIEF SUMMARY OF THE INVENTION

The present invention provides among other things a system and a method of a removable wheel device. It is an objective of this invention to make a goal for a field game movable over a flat surface or a rough terrain of a sports field by attaching one or more removable wheel devices to the bottom of the goal. The above objective may be achieved using a removable wheel device comprising a sleeve with at least a base, one or more support(s), and at least one cantilevered member, as well as a wheel with an axle, and a bracket connecting the axle of the wheel and the base of the sleeve. This objective may also be achieved using methods involving assembling the removable wheel device aforementioned.

In one example of this invention, the support of the sleeve comprises at least one sidewall. In another embodiment, the sleeve has an opening at the back of the device so that the device can slide over a bottom corner of the goal frame. With the opening, the space inside the sleeve, formed by the base, the support, and the cantilevered member, is designed to be sufficient to hold the bottom of the goal frame. Moreover, the cantilevered member may be U-shaped with an arced portion in the front of the sleeve to prevent the goal frame from passing through in certain embodiments. And the width between the opposite arms of the U-shaped cantilevered member is sufficient to allow the device to slide around the substantially vertical pipe of the goal frame, but is not wide enough for the bottom of the goal frame to pass. However, the widths of the two arms of the U-shaped cantilevered member may be different to accommodate goal frames that have a vertical pipe offset from the center position of the bottom.

In addition, the sleeve and/or the bracket may be made of any material, such as steel or any composite material, which is able to support the stress and weight of the goal. The bracket may be attached to the bottom of the sleeve permanently, or it can be removable from the sleeve by any methods known to any person skilled in the relevant art, including using screws or bolts. The bracket can also be rotatable in some embodiments, so that the wheel can face any direction. For the rotating bracket, there can be a locking mechanism to maintain the position of the bracket and the wheel.

Alternatively, the objective may be achieved using a removable wheel device, comprising a wheel with an axle, a bracket coupled to the axle of the wheel, and a sleeve which has at least one base and one or more member(s) extending from a portion of a perimeter of the base in a direction away from the wheel. The base of the sleeve is coupled to the bracket while substantially perpendicular to the bracket. The cross section of the base and the at least one member is substantially U-shaped. In one embodiment, the sleeve has an opening at the back of the device so that the device can slide over a bottom corner of the goal frame. In another embodiment to be used with a lacrosse goal, the bracket is coupled to the sleeve at an angle such that the wheel is perpendicular to the upper crossbar of the lacrosse goal. An alternative embodiment includes a detachable latch extending from the member of the sleeve and located substantially parallel to the base to prevent the goalpost from moving freely on the wheel device.

In some embodiments, a removable wheel device for a field game goal may comprise a wheel with an axle therethrough, a bracket extending substantially parallel to a radius of the wheel and coupled to the axle of the wheel and a sleeve. The sleeve may comprise a substantially U-shaped base that is substantially perpendicular to and coupled to the bracket, at least one support extending from a portion of a perimeter of the base in a direction away from the wheel, at least one substantially planar top plate coupled substantially perpendicularly to the at least one support and at least partially overhanging the base, the substantially planar top plate comprising a notch extending from a first edge of the substantially planar top plate toward a second, curved edge of the substantially planar top plate and located proximal to a first side edge of the substantially planar top plate, the notch comprising at least a first notch portion having a greater width than a second notch portion, and at least one protrusion extending from and coupled substantially parallel to the at least one support and extending toward an interior of the sleeve.

Particular aspects may comprise one or more of the following features. The substantially U-shaped base may comprise a first substantially straight edge. The bracket may be positioned such that the axle is substantially parallel to the first substantially straight edge of the base. The bracket may be positioned such that the axle is non-parallel to the first substantially straight edge of the base. The bracket may be detachable from the substantially U-shaped base. The bracket may be rotatable relative to the sleeve. The device may further comprise a locking mechanism coupled to the rotatable bracket. The at least one protrusion may spans less than a length of the at least one support. The second notch portion may comprise a first edge proximal to the first side of the top plate and the protrusion has a width that is less than or equal to a distance between the first edge of the second notch portion and the first side of the top plate. The sleeve may further comprise at least two supports extending from a portion of a perimeter of the base in a direction away from the wheel. The substantially U-shaped base may further comprise a second, curved edge wherein a front opening is formed by the second, curved edge of the substantially U-shaped base, and the second, curved edge of the substantially planar top plate. The first substantially straight edge of the substantially U-shaped base and the first edge of the substantially planar top plate may form a rear opening.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventor is fully aware that he can be his own lexicographer if desired. The inventor expressly elects, as his own lexicographer, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventor's intent and desire that the simple, plain and ordinary meaning to the terms be applied to the interpretation of the specification and claims.

The inventor is also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventor is fully informed of the standards and application of the special provisions of 35 U.S.C. §112, ¶6. Thus, the use of the words "function," "means" or "step" in the Detailed Description or Description of the Drawings or claims is not intended to somehow indicate a desire to invoke the special provisions of 35 U.S.C. §112, ¶6, to define the invention. To the contrary, if the provisions of 35 U.S.C. §112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventor not to invoke the provisions of 35 U.S.C. §112, ¶6. Moreover, even if the provisions of 35 U.S.C. §112, ¶6 are invoked to define the claimed inventions, it is intended that the inventions not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

BRIEF DESCRIPTION OF THE SEVERAL VIEWS OF THE DRAWINGS

A more complete understanding of the present invention may be derived by referring to the detailed description when considered in connection with the following illustrative figures. In the figures, like reference numbers refer to like elements or acts throughout the figures.

FIG. 1 depicts a perspective view of an embodiment of the removable wheel device from the top.

FIG. 2 depicts a perspective view of the removable wheel device as in FIG. 1 from the bottom.

FIG. 3 depicts an implementation of a pair of the removable wheel devices mounted to a lacrosse goal frame.

FIG. 8 depicts a perspective view of an embodiment of a removable wheel device with an axle parallel with a first straight edge of the base and a notch located equidistant from the sides of the sleeve.

FIGS. 9-10 show bottom and top views of the device of FIG. 8, respectively.

FIG. 15 depicts an embodiment of a removable wheel device having a protrusion within the sleeve.

Figure 4:
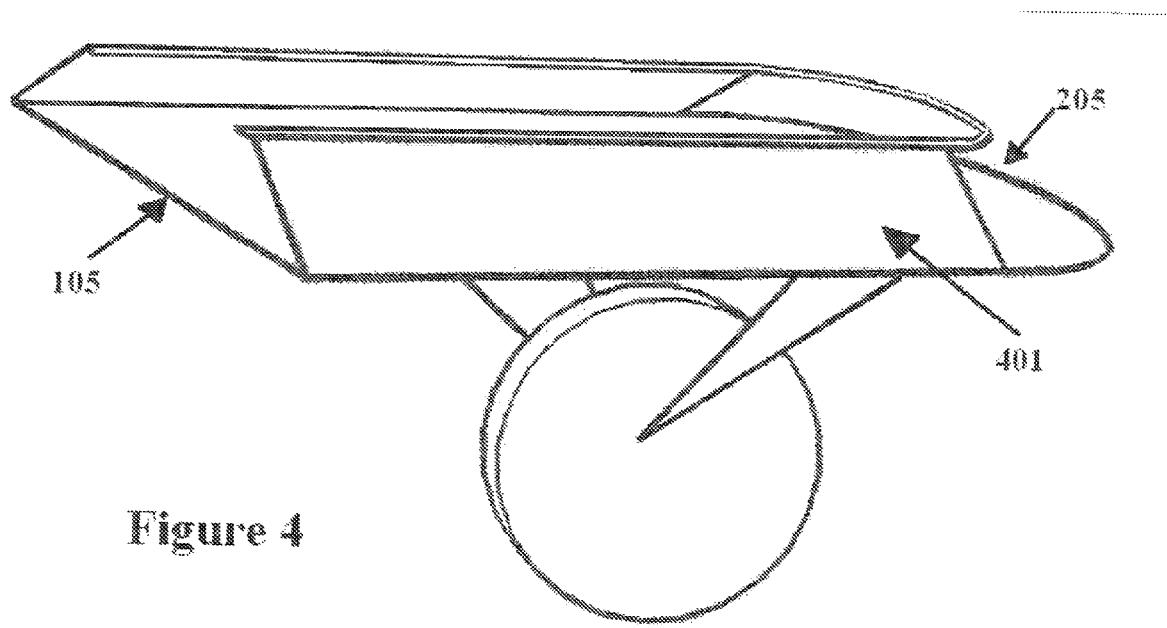
FIG. 4 represents an embodiment of the removable wheel device that has two sidewalls leaning inwards.

Elements and acts in the figures are illustrated for simplicity and have not necessarily been rendered according to any particular sequence or embodiment.

DETAILED DESCRIPTION OF THE INVENTION

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates an embodiment of this invention. In this embodiment, the device has a wheel 103 with an axle 109 therethrough, a bracket 102, and a sleeve 101. The bracket 102 may extend in a direction parallel to a radius of the wheel 103. The bracket 102 may be detachable from the base 105. The sleeve 101 has a front portion 108 and a rear portion 110. The sleeve 101 has a base 105, two supports 107, wherein the supports may be sidewalls, and a U-shaped cantilevered member 106 with a first arm 111, a second arm 112, and an arced portion 113 connecting the two. One of ordinary skill in the art would recognize that the arced portion 104 need not be arced, and any shape that connects the two arms 111, 112 would suffice. As one non-limiting example of a removable wheel device, the space surrounded by the cantilevered member 106 is 2" wide and has a 1" radius arced portion 104 at the front end of the U-shaped cantilevered member 106, although one of ordinary skill in the art would recognize that any appropriate dimensions may be used.

In another implementation, the bracket 102 may rotate relative to the sleeve 101 as illustrated in FIG. 2. This feature makes a goal attached to the removable wheel device easier to steer. The bracket 102 may also comprise or be coupled to a locking mechanism to hold the bracket 102 at a specific angle relative to the sleeve 101. Moreover, in this embodiment, the sleeve 101 has an opening 205 at the front end to leave room for the bottom corner of the goal. For example, the bottom flat iron of a lacrosse goal frame can be of different size due to the different manufacturing techniques adopted. This opening 205 makes a removable wheel device for the lacrosse goal suitable to goals made by different manufactures.

In one embodiment, two removable wheel devices 100 are used with a lacrosse goal as shown in FIG. 3. To attach the removable wheel devices 100 to the goal, a person may lift the appropriate side of the goal at 307 or 308 and slide the devices 100 over a flat iron 303 and snugly around the goalpost 302 at location 304. When both devices 100 are in place, the person can tilt the goal face side down, while facing the goal, by pulling the cross bar 305 and pivoting the goal over the removable wheel devices 100. When the goal is balanced over the removable wheel devices 100, a person can pull or push the goal to a different place. Another alternative is to slide the devices 100 on the goal and lift the goal from the triangular point of the flat iron 306. This pivots the goal over the devices 100 at location 304. The goal is now ready to move to another place.

In some embodiments, the distance between the arms 111, 112 of the U-shaped cantilevered member 106 of the sleeve 101 is 2 inches because the vertical goalposts 302 of a lacrosse goal have a diameter of less than 2 inches, and the flat irons 303 attached to the posts 302 at the bottom generally have a width of more than 2 inches. However, if this device 100 were to be used for a different type of goal, one of ordinary skill in the art would readily recognize that any appropriate dimensions are applicable. The bracket 102 may be coupled to the sleeve 101 at an angle such that the wheel 103 is perpendicular to a plane comprising two goalposts 302 and a crossbar 305 of a lacrosse goal.

Figure 5:
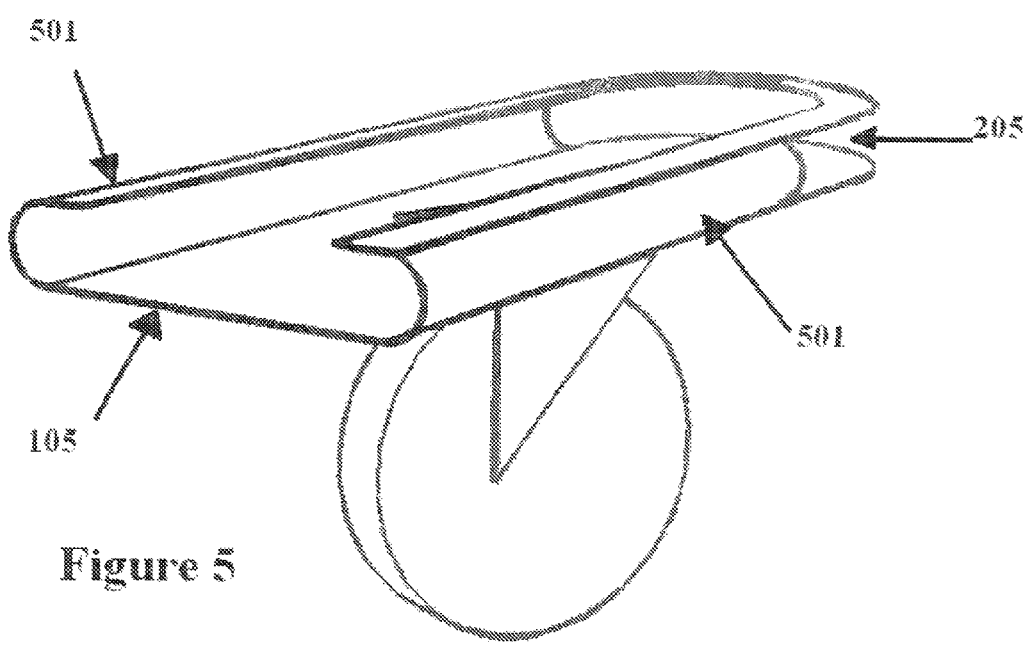
FIG. 5 shows an embodiment of a removable wheel device having curved sidewalls.

Some embodiments may have a member 401 of the sleeve leaning inwards so that the goal may slide into the space formed by the member 401 of the sleeve 101 and the base 105. As shown in FIG. 4, the member 401 of such a device has an opening 205 in the front and the rest is bent inwards. The cross section of the member 401 and the base 105 may be substantially U-shaped. Another embodiment shown in FIG. 5 has a curved sidewall 501 with an opening 205 in the front. The cross section of the sidewall 501 and the base 105 may also be generally U-shaped.

Figure 6:
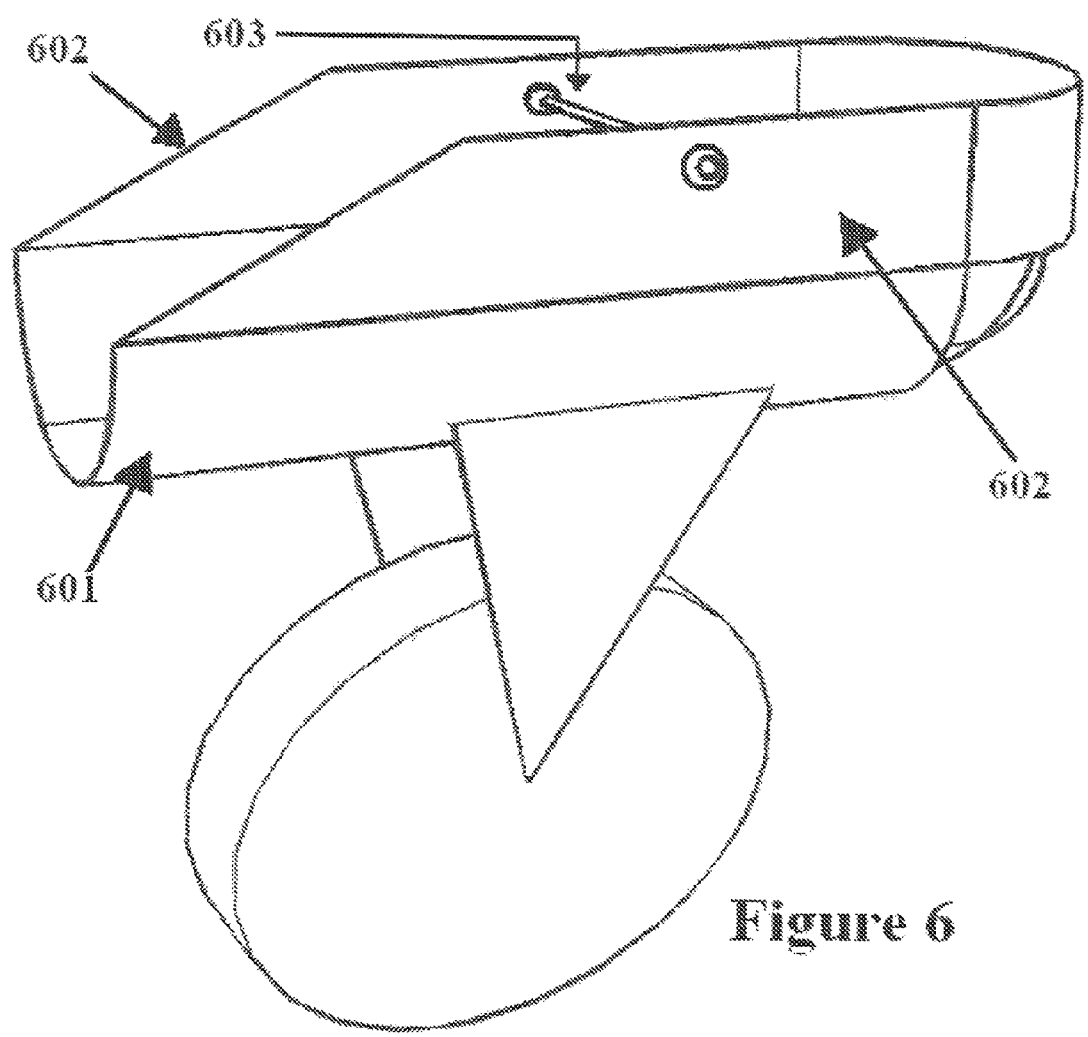
FIG. 6 depicts an embodiment of a removable wheel device having a sleeve that has a curved base, a continuous sidewall, and a latch across the sidewall.

As shown in FIG. 6, an embodiment of the device may have a sleeve with a curved base 601, a continuous sidewall 602, and a detachable latch 603 that traverses the space in between sidewalls 602. The latch 603 may be detached when the bottom of the goal slides in the sleeve 101 and is attached after the goalpost is in position. With this latch 603, the goalpost cannot slide backward or move freely from the wheel device when the goal is being moved.

Figure 7:
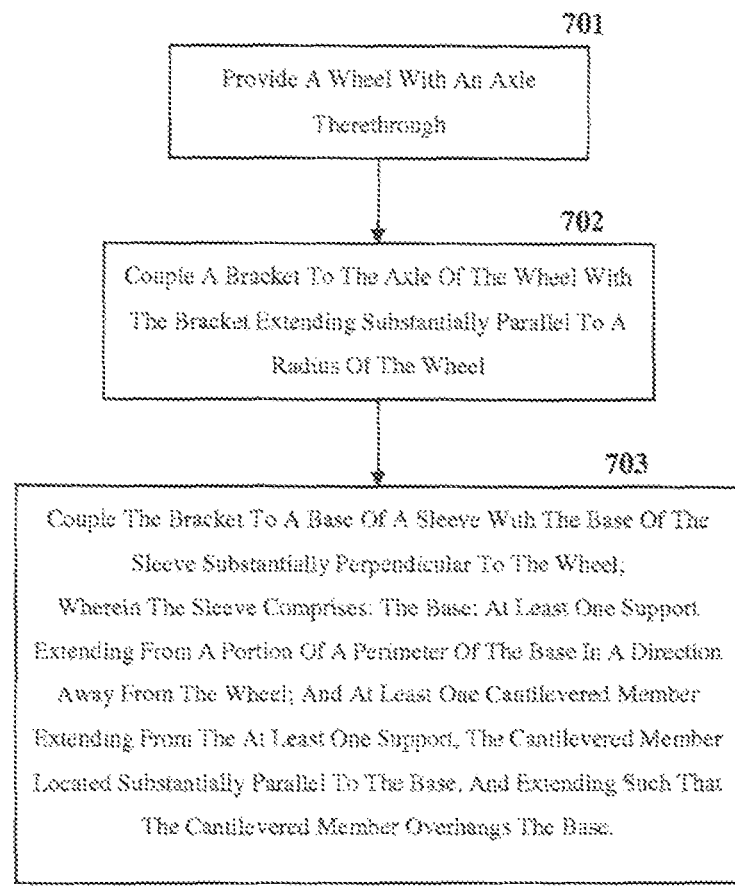
FIG. 7 depicts a method for making a removable wheel device.

Referring to FIG. 7, a method for making a removable wheel device is disclosed. A wheel with an axle therethrough is provided 701. One of ordinary skill in the art would know that many different types of wheels and axles would be possible. A bracket is coupled to the axle with the bracket extending substantially parallel to a radius of the wheel 702. A base of a sleeve is coupled to the bracket. The base may be substantially perpendicular to the wheel. The sleeve may comprise at least one support extending from a portion of a perimeter of the base in a direction away from the wheel. The sleeve may further comprise at least one cantilevered member extending from the at least on support, the cantilevered member located substantially parallel to the base, and extending such that the cantilevered member overhangs the base 703. A person of ordinary skill in the art would know that no specific order of coupling is required, and that a variety of materials, including metal, may be used.

Referring to FIGS. 8 and 9, a removable wheel device may comprise a sleeve 101 having a base 105 which may be substantially U-shaped or formed into any other shape that one of ordinary skill in the art would recognize as appropriate. The sleeve 101 may further comprise at least two supports 107 that extend from a portion of a perimeter and that is coupled substantially perpendicularly to a top plate 1505 which may in some embodiments be substantially planar and at least partially overhang the base 105 such that the top plate 1505 is located at least partially above the base 105. In some implementations, the removable wheel device may be configured such that the axle 109 is parallel to a first straight edge 805 of the base 105. This feature makes a goal with goal posts already square to the field more easily moved. Goals may have any number of different designs. Goals including those used for high school, club, and NCAA can be built with slight variations. The notch 820 depicted in FIGS. 8 and 10 may be used to accommodate those goals with posts 302 that are substantially centered on the flatiron 303. The notch 820 may extend from the first edge of the substantially planar top plate 1510 toward a second curved edge of the substantially planar top plate 1515. This notch 820 may be equidistant from the first side edge 815 and the second side edge 810 of the substantially planar top plate 1505.

Figure 11:
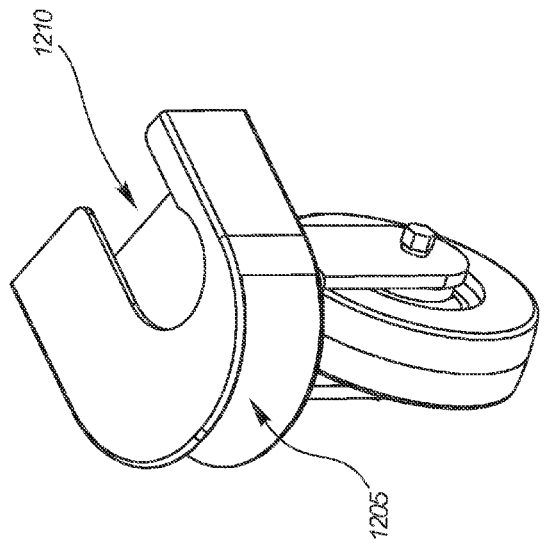
FIG. 11-12 depict embodiments of a removable wheel device comprising a notch located proximal to a side edge of the sleeve.
Figure 12:
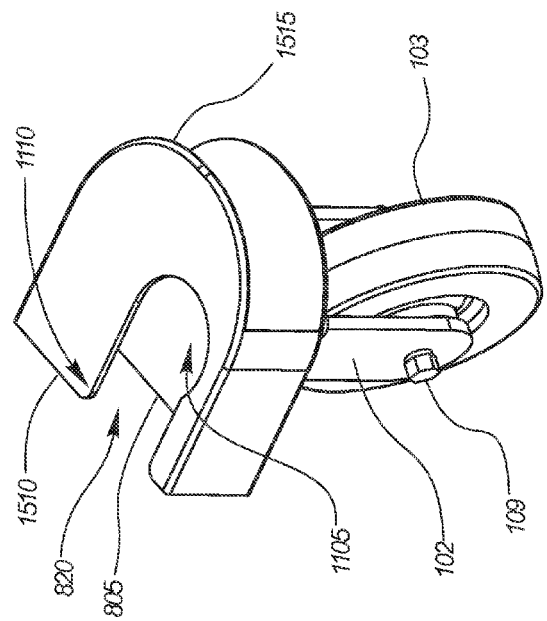

FIGS. 11 and 12 depict an implementation of a removable wheel device configured to fit the left and right side of a field game goal, respectively, when the goal posts 302 are not substantially centered on the flat iron 303. A notch 820 may be comprised of a first notch portion 1105 and a second notch portion 1110 and may extend from a first edge of the top plate 1510 toward a second, curved edge of the top plate 1515. The first notch portion 1105 may have a greater width than a second notch portion 1110. In this particular embodiment the axle 109 is non-parallel to the first straight edge of the base 805 but the axle 109 could very well be parallel as the angle of the goal posts 302 dictates the angle of the wheel 103. Additionally, the bracket 102 may be rotatable relative to the sleeve 101 and the device may further comprise a locking mechanism coupled to the rotatable bracket. A front 1205 and rear 1210 opening allow the goal post 302 and flat iron 303 to be inserted into the sleeve 101. The front opening 1205 does not prevent stylistically different flat irons 303 from resting inside the sleeve 101.

Figure 13:
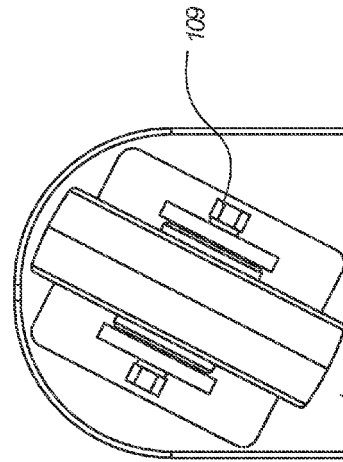
FIGS. 13-14 shows the underside of a removable wheel device comprising an axle that is non-parallel to a straight edge of the base.
Figure 14:
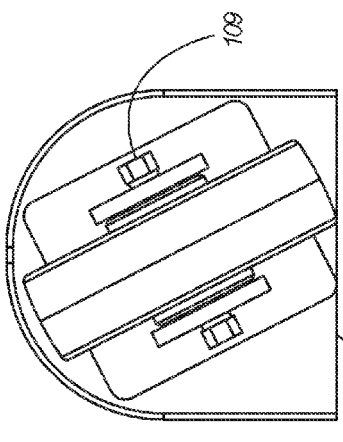

FIGS. 13 and 14 depict a bottom view of the removable wheel device for both the left and right side of a field game goal showing the axle 109 that is not parallel to the first edge of the base 805.

FIG. 15 depicts a notch 820 that may be proximal to a first side edge 815 of the substantially planar top plate 1505 because some field goal's goal posts 302 at location 304 are closer to the center of the crossbar 305 in relation to the flat iron 303. The top plate 1505 also includes a second side edge 810. The notch 820 may be comprised of a first notch portion 1105 and a second notch portion 1110 and may extend from a first edge 1510 of the top plate 1505 toward a second curved edge 1515 of the top plate 1505. The first notch portion 1105 may have a greater width than the second notch portion 1110. A protrusion 1520 may extend from the at least one support 107 toward the interior of the sleeve 101. In some embodiments, the protrusion 1520 may span less than the full length of the at least one support 107. In other embodiments, the protrusion 1520 may span the entire length of the at least one support 107. The protrusion 1520 may have a width 1522 that is less than or equal to a distance between the first edge of the second notch portion 1521 and the first side edge of the top plate 815. As shown, the substantially planar top plate 1505, the base 105, and the at least one support 107 form a front opening 1205 and a rear opening 1210. In some embodiments, the sleeve may have additional openings along either side which may be formed by the substantially planar top plate 1505, the base 105 and one or more supports 107. The base 105 may be comprised of a first substantially straight edge 805 and a second curved edge 1525. The front opening 1205 may be formed between the second, curved edge of the substantially U-shaped base 1525, and the second, curved edge of the planar top plate 1515. The rear opening 1210 may be formed between the first substantially straight edge of the base 805 and the first edge of the substantially planar top plate 1510.

I claim:

1. A removable wheel device for a field game goal, comprising:
   a wheel with an axle therethrough;
   a bracket extending substantially parallel to a radius of the wheel and coupled to the axle of the wheel; and
   a sleeve comprising:
      a substantially U-shaped base that is substantially perpendicular to and coupled to the bracket;
      at least one support extending from a portion of a perimeter of the base in a direction away from the wheel;
      at least one substantially planar top plate coupled substantially perpendicularly to the at least one support and at least partially overhanging the base, the substantially planar top plate comprising a notch extending from a first edge of the substantially planar top plate toward a second, curved edge of the substantially planar top plate and located proximal to a first side edge of the substantially planar top plate, the notch comprising at least a first notch portion having a greater width than a second notch portion; and
      at least one protrusion extending from and coupled substantially parallel to the at least one support and extending toward an interior of the sleeve.

2. The device of claim 1 wherein the substantially U-shaped base comprises a first substantially straight edge.

3. The device of claim 2 wherein the bracket is positioned such that the axle is substantially parallel to the first substantially straight edge of the base.

4. The device of claim 2 wherein the bracket is positioned such that the axle is non-parallel to the first substantially straight edge of the base.

5. The device of claim 2 wherein the first substantially straight edge of the substantially U-shaped base and the first edge of the substantially planar top plate form a rear opening.

6. The device of claim 1 wherein the sleeve further comprises at least two supports extending from a portion of a perimeter of the base in a direction away from the wheel.

7. The device of claim 6 wherein the substantially U-shaped base further comprises a second, curved edge wherein a front opening is formed by the second, curved edge of the substantially U-shaped base, and the second, curved edge of the substantially planar top plate.

8. The device of claim 1 wherein the at least one protrusion spans less than a length of the at least one support.

9. The device of claim 1 wherein the second notch portion comprises a first edge proximal to the first side of the top plate and the protrusion has a width that is less than or equal to a distance between the first edge of the second notch portion and the first side of the top plate.

10. The device of claim 1 wherein the bracket is detachable from the substantially U-shaped base.

11. The device of claim 1 wherein the bracket is rotatable relative to the sleeve.

* * * * *